United States Patent
Pan et al.

(10) Patent No.: US 7,625,120 B2
(45) Date of Patent: Dec. 1, 2009

(54) ROLLER RETAINER

(75) Inventors: Hung-Sung Pan, Taichung (TW); Chien-Wei Tsou, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 484 days.

(21) Appl. No.: 11/697,283

(22) Filed: Apr. 5, 2007

(65) Prior Publication Data

US 2008/0247854 A1    Oct. 9, 2008

(51) Int. Cl.
*F16C 29/06*    (2006.01)
(52) U.S. Cl. .................... 384/51; 74/424.88
(58) Field of Classification Search .............. 384/41, 384/44, 45, 47, 51, 53, 56, 57; 74/424.88
See application file for complete search history.

(56) References Cited

U.S. PATENT DOCUMENTS

| | | | | |
|---|---|---|---|---|
| 4,583,793 A | * | 4/1986 | Blatter | 384/44 |
| 4,697,935 A | * | 10/1987 | Yasui | 384/47 |
| 4,755,065 A | * | 7/1988 | Walter et al. | 384/47 |
| 4,944,607 A | * | 7/1990 | Jacob | 384/44 |
| 5,549,391 A | * | 8/1996 | Engbersen et al. | 384/51 |
| 6,575,632 B2 | * | 6/2003 | Kawaguchi et al. | 384/51 |
| 6,692,151 B2 | * | 2/2004 | Vegh et al. | 384/51 |
| 6,886,983 B2 | * | 5/2005 | Tsuboi et al. | 384/51 |
| 7,210,849 B2 | * | 5/2007 | Yamazaki et al. | 384/51 |

FOREIGN PATENT DOCUMENTS

JP          2002048143 A  *  2/2002
WO       WO 9314326 A1  *  7/1993

* cited by examiner

*Primary Examiner*—Marcus Charles
(74) *Attorney, Agent, or Firm*—Banger Shia

(57) ABSTRACT

A roller retainer mounted on a roller comprises a first guiding frame and a second guiding frame that are integrally connected with each other in a vertically staggered manner. The first guiding frame and the second guiding frame are located along the two diagonals of the roller respectively. The thickness of the first guiding frame and the second guiding frame is utilized to keep the space between the two non-loading surfaces of roller and a track. The roller retainer can further keep the space between each roller. Thereby, the roller retainer can prevent the rollers from contacting each other; the loading surfaces can still contact the track and the non-loading surfaces are prevented from colliding with and rubbing against the track, thus reducing the noise and ensuring the moving direction.

5 Claims, 7 Drawing Sheets

ROLLER RETAINER

BACKGROUND OF THE INVENTION

1. Field of the Invention

The present invention relates to a retainer, and more particularly to a roller retainer, which can prevent the rollers from contacting each other, and keep the non-loading surfaces of the rollers from colliding with and rubbing against the track while the loading surfaces of the rollers can still contact the track, consequently reducing the noise and assuring the moving direction.

2. Description of the Prior Art

Linear guideway and roller screw are used more and more widely in modern industries. In addition to its high precision transmission performance, the linear guideway and roller screw also have many other advantages, such as low friction loss, high ratio of energy conversion, low noise, high rigidity and wear-resistance. Therefore, it is self-evident that the linear guideway or the roller screw is very important to various industrial mechanisms.

Normally, rollers are one of the frequently used rolling elements of the linear guideway and the roller screw, in order to enable the rollers between the subassemblies to circulate endlessly, roller retainers are disposed on the rollers. Accordingly, the present industry emphasis is focused on how to research and develop the more competitive roller retainers.

FIGS. 1-3 show two frequently used conventional roller retainers; please refer to the following descriptions:

FIG. 1 shows a conventional roller retainer disclosed by JP Pat. No. 2002-48143, wherein an annular groove 11 is formed in the middle portion of each roller 10 of a roller screw, and every other roller 10 is disposed with a space ring 12. Since the annular groove 11 formed in the middle portion of the roller 10 is provided for receiving the protrusions of the space ring 12, the space ring 12 disposed on every other roller 10 can separate the rollers from each other, and prevent the rollers from colliding each other. The aforementioned roller retainers still have the following shortcomings:

First, since the rollers 10 are positioned on the tooth-shaped track 13 between the roller screw and the nut, the screw and the nut will not only contact the loading surfaces of the roller 10, but also contact the non-loading surfaces of the rollers, thus causing the collision and the friction therein, and influencing the moving direction of the rollers 10, as a result, it cause attrition and stress loss.

Second, in order that the space rings 12 disposed on the rollers 10 can run smoothly along the tack 13 between the roller screw and the nut, the track 13 should be additionally formed with a groove 14. Since the groove 14 is formed in the loading surface of the rollers 10, the contacting length of the rollers 10 is reduced and the load capability of the product is consequently decreased.

To solve the aforementioned problems, another internal circulation roller screw was developed. Please refer to FIGS. 2-3, which show a conventional roller retainer disclosed by U.S. Pat. No. 6,575,632, wherein a stopping annular retainer 16 is diagonally mounted on the roller 15 and is disposed in the V-shaped track formed between the roller screw (not shown) and the nut 17. The stopping annular retainer 16 is used to prevent the collision between the rollers or the energy loss caused by attrition, and a groove can be formed to avoid the loading surfaces of the roller 15 contacting the roller screw and the nut 17. This improved technology appears to have solved the forepassed problems, but it still has the following problems:

First, since the stopping annular retainer 16 is only mounted along a single diagonal of the roller 15, it must enable the non-loading surfaces on both side surfaces of the roller 15 to keep a distance from the roller screw or the nut 17. But the roller will apply a torque to the stopping annular retainer 16 while rotating, consequently, the roller 15 will incline to the non-loading surfaces thereof, thus the stopping annular retainer 16 is difficult to position, and likely to fall off, this technology is quite easy to cause the stopping annular retainer to fall off and the rollers to be jammed.

Second, since the stopping annular retainer 16 is only disposed along a single diagonal of the roller 15, a certain thickness and a material stress are required for the stopping retainer 16 to hold the roller 15 stably, otherwise the disengagement of the roller is unavoidable. But if the thickness of the stopping retainer 16 is excessively thick, the space between each roller 15 will be increased, and consequently the number of rollers 15 and the load capability will also be reduced.

Third, rollers disposed in the liner mechanisms (such as roller screws or liner guideways) must perform re-circulation motion, but each of this conventional rollers 15 is only diagonally disposed with a single stopping annual retainer 16, since the roller 15 must overturn during the circulation, the stopping annual retainer 16 disposed on the single diagonal of the rollers will lose the effect of abutting against and separating the rollers 15, and cause the non-loading surfaces of the roller 15 to contact other components. Consequently, the collision and the attrition will still occur during the overturn of the rollers 15.

The present invention has arisen to mitigate and/or obviate the afore-described disadvantages.

SUMMARY OF THE INVENTION

The primary objective of the present invention is to provide a roller retainer, which is less likely to fall off and can prevent the rollers from jamming, thus ensuring smooth circulation of the rollers.

The second objective of the present invention is to provide a roller retainer, which can prevent the rollers from contacting each other and prevent the non-loading surfaces of the rollers from colliding with and rubbing against the track.

The third objective of the present invention is to provide a roller retainer whose space between each roller need not be increased.

To obtain aforementioned objectives, the roller retainer mounted on the rollers comprises a first guiding frame and a second guiding frame that are integrally connected with each other in a vertically staggered manner. The first guiding frame and the second guiding frame are located along two diagonals of each roller respectively. Additionally, the thickness of the first guiding frame and the second guiding frame is utilized to keep the space between the non-loading surfaces and the track, so as to prevent the non-loading surfaces from colliding with the surface of the track, avoid the unnecessary collision and attrition. Moreover, the roller retainer can further keep the space between each roller.

Thereby, the first guiding frame and the second guiding frame that are vertically connected with each other in the staggered manner in accordance with the present invention can prevent the rollers from contacting each other in various operational conditions (including the overturn operational process during the re-circulation of the rollers). The non-loading surfaces of the rollers are restricted by the first guiding frame and the second guiding frame, so the rollers are difficult to incline and fall off when bearing the torque, thus effectively reducing the noise and improving the operation stability and so on.

It is important that, the roller retainer in accordance with the present invention is introduced by the research efforts of experiments and the tests, and it is found that if be made of plastic or rubber which has flexibility, the roller retainer will exert a relatively fine effect. In addition, the thickness of first guiding frame and the second guiding frame need not be excessively thick, because the roller can be stably positioned by the restriction of the first guiding frame and the second guiding frame that are vertically connected with each other in the staggered manner. Consequently, the roller retainer in accordance with the present invention will not make the space between each roller excessively great, the track can be adequately disposed with a predetermined number of rollers, and the load capability of the product can also be kept

DETAILED DESCRIPTION OF THE PREFERRED EMBODIMENTS

Figure 1:
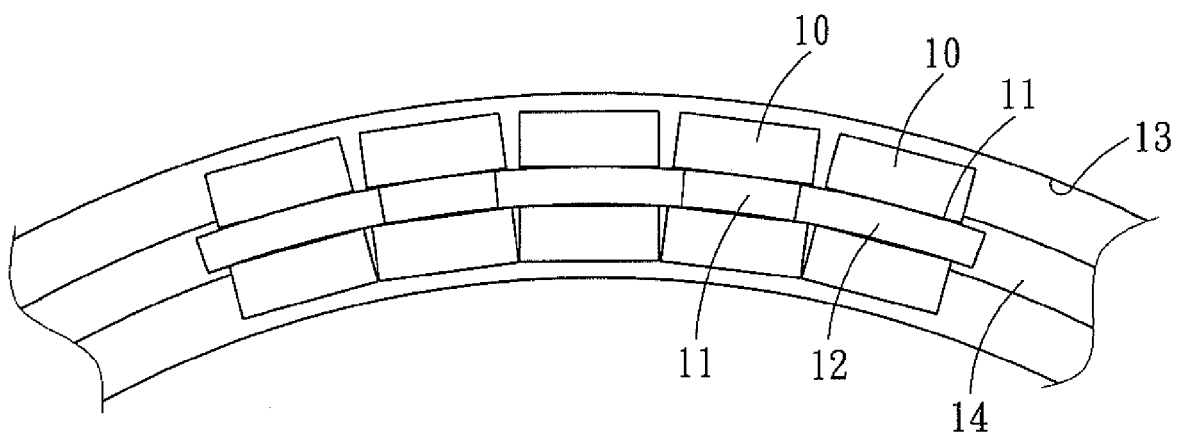
FIG. 1 is an assembly view of a conventional roller retainer disclosed by JP Pat. No. 2002-48143.
Figure 2:
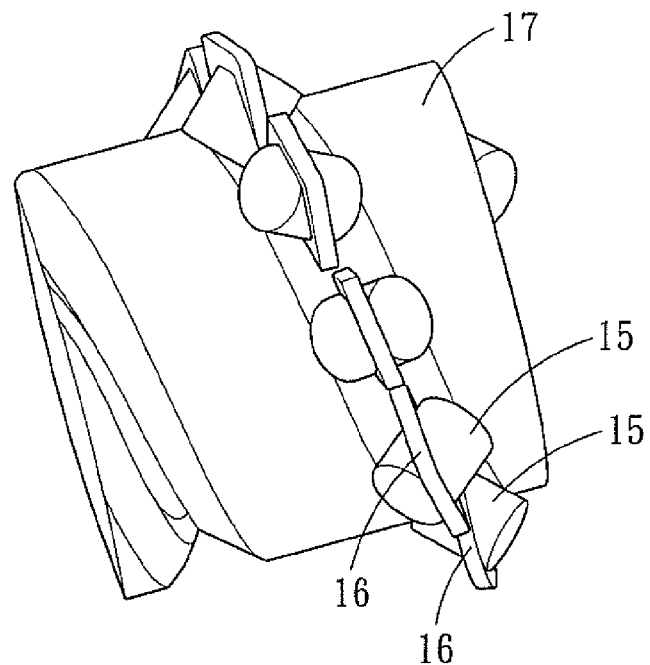
FIG. 2 is an assembly perspective view of a conventional roller retainer disclosed by U.S. Pat. No. 6,575,632.
Figure 3:
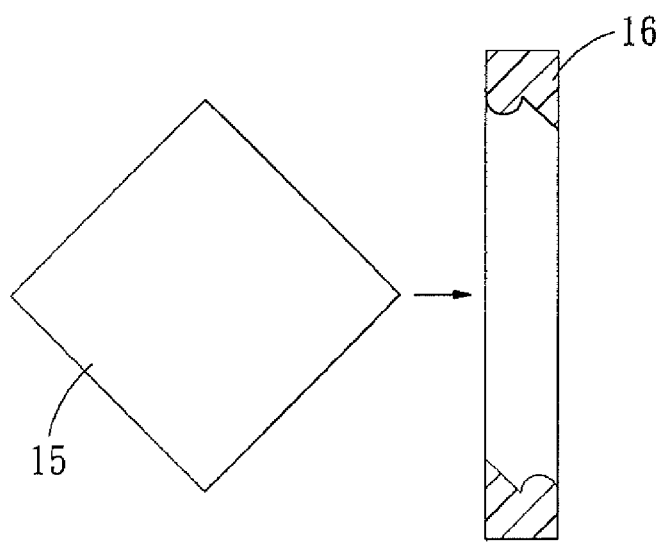
FIG. 3 is an exploded cross sectional view of the conventional roller retainer disclosed by U.S. Pat. No. 6,575,632.
Figure 4:
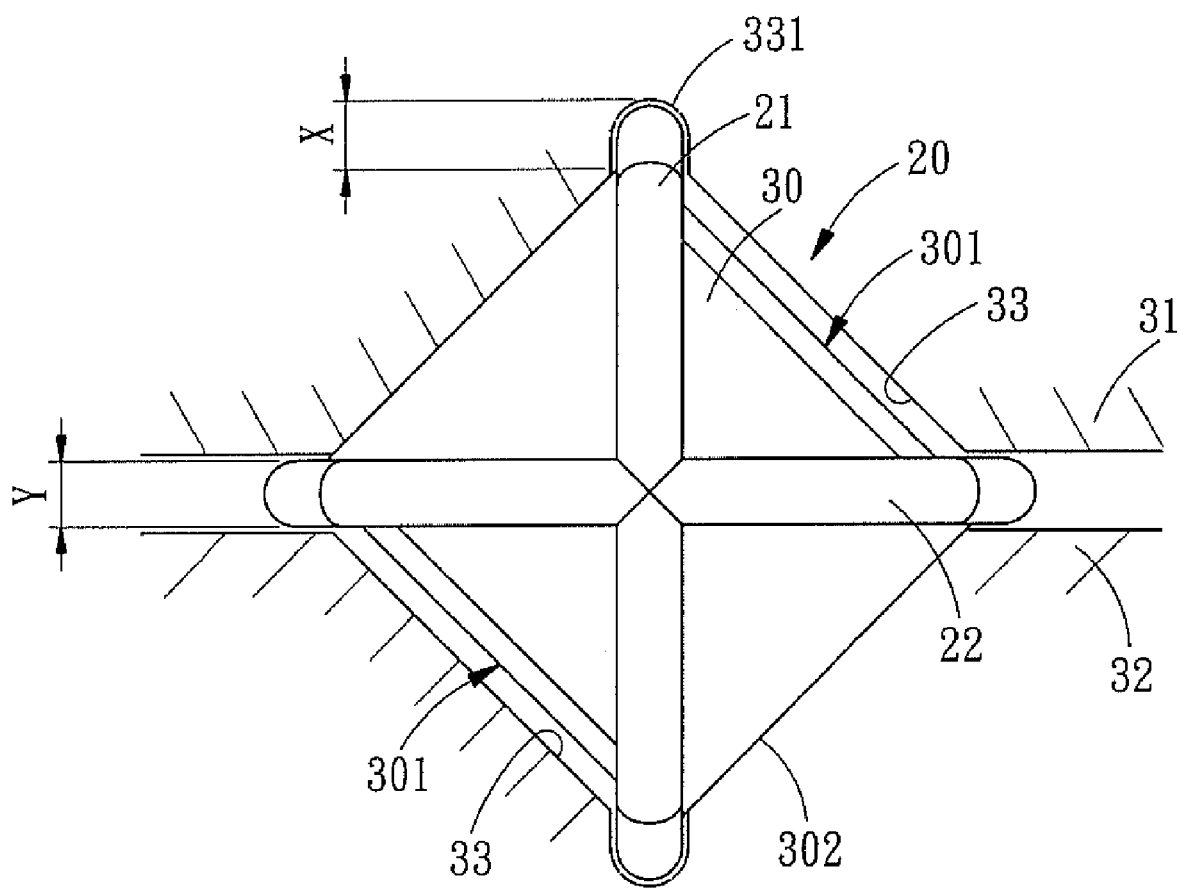
FIG. 4 is an assembly cross sectional view of a roller retainer in accordance with the present invention.
Figure 5:
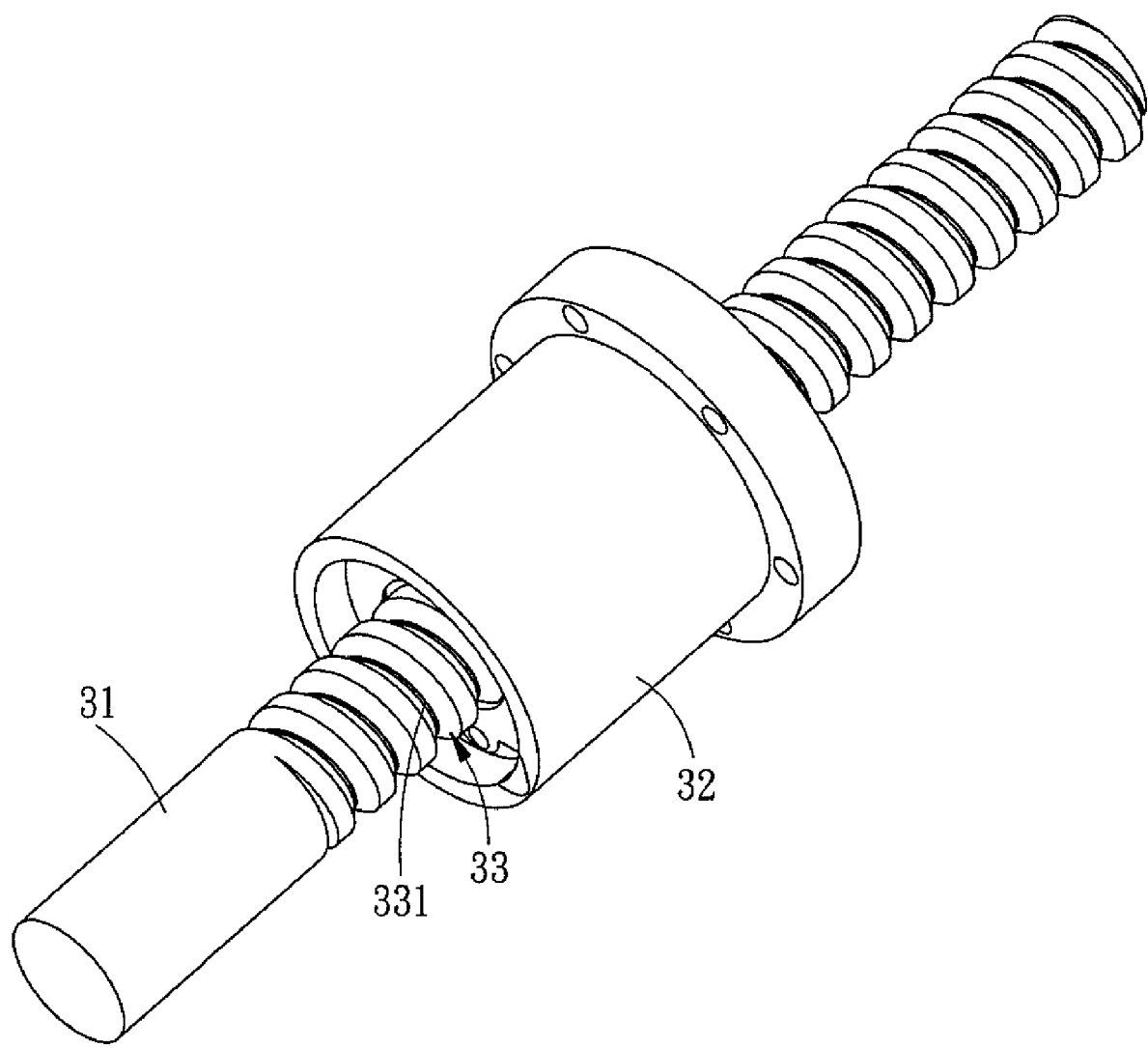
FIG. 5 is a perspective view of the roller retainer disposed in a roller screw in accordance with the present invention.
Figure 6:
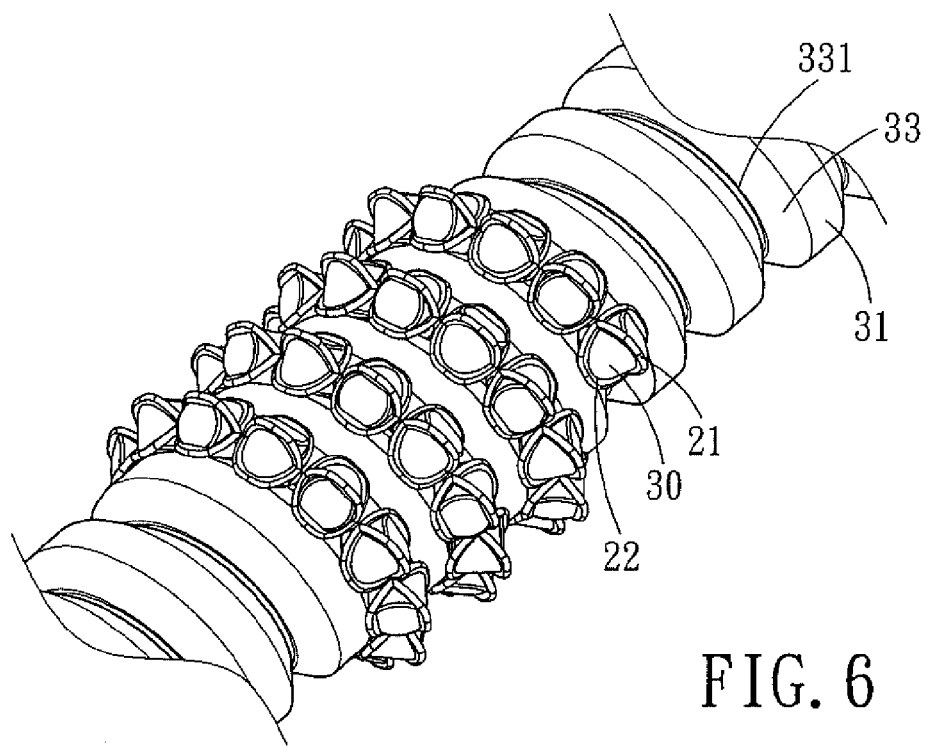
FIG. 6 is an amplified perspective view of showing the rollers in accordance with the present invention and the screw.
Figure 7:
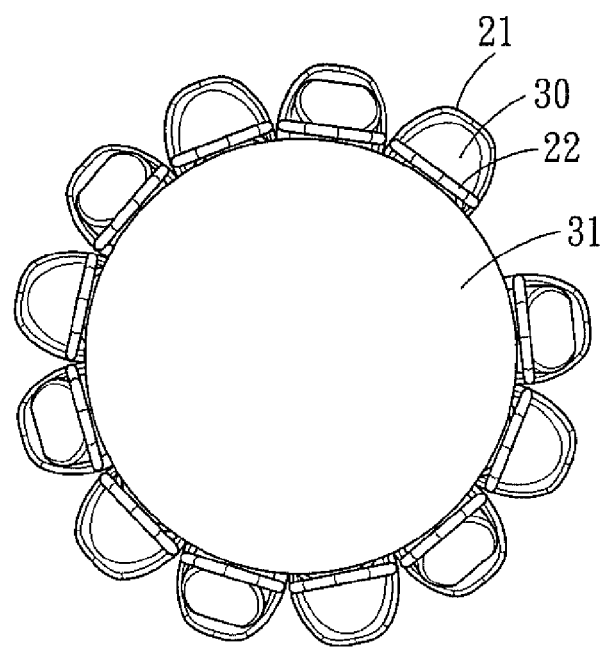
FIG. 7 is a side view of showing the assembly of the roller retainer and the screw in accordance with the present invention.

The present invention will be clearer from the following description when viewed together with the accompanying drawings, which show, for purpose of illustrations only, the preferred embodiment in accordance with the present invention.

Referring to FIGS. 4-7, a roller retainer in accordance with a preferred embodiment of the present invention is characterized in that:

A roller retainer 20 is disposed on a roller 30, the roller 30 is arranged in a track 33 defined by a screw 31 and a nut 32, and a guiding groove 331 is formed in the mid portion of the track 33.

The roller retainer 20 comprises a first guiding frame 21 and a second guiding frame 22 that are integrally connected with each other in a vertically staggered manner, and the first frame 21 and the second frame 22 are frame-shaped structures located along the two diagonals of the roller. The first guiding frame 21 is located along one diagonal of the roller 30, and the second guiding frame 22 is located along the other diagonal of the roller 30. Additionally, the first guiding frame 21 is movably disposed in the central guiding grooves 331, and the second guiding frame 22 is slidably positioned between the screw 31 and the nut 32. The thickness X, Y of the first guiding frame 21 and the second guiding frame 22 in the loading direction of the roller 30 maintain the space between the two non-loading surfaces 301 and the track 33, it doesn't interfere with the two loading surfaces 302. Moreover, the roller retainer 20 can further maintain the space between each roller 30.

The aforementioned is the summary of the positional and structural relationship of the respective components of the preferred embodiment in accordance with the present invention.

Figure 8:
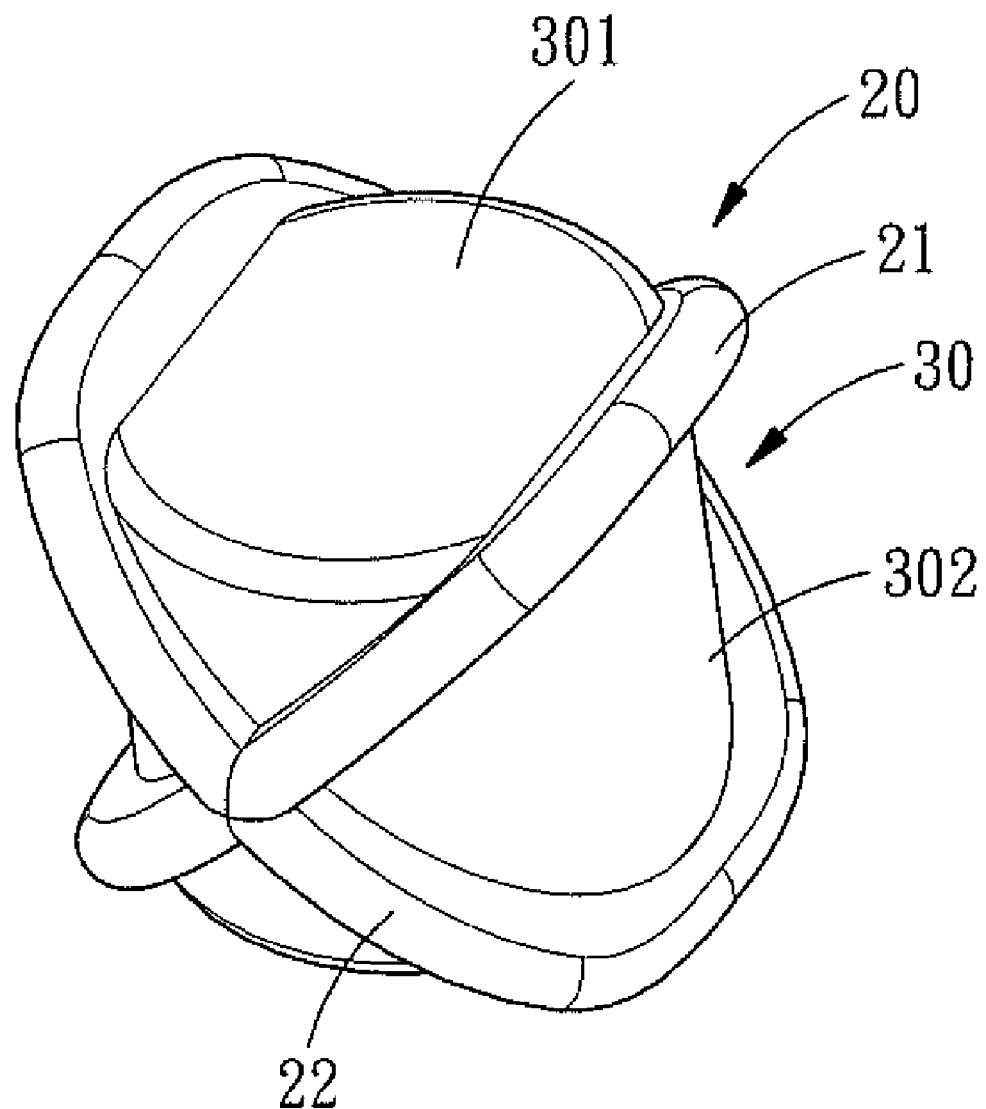
FIG. 8 is a perspective view of showing that the roller retainer is mounted on the roller in accordance with the present invention.
Figure 9:
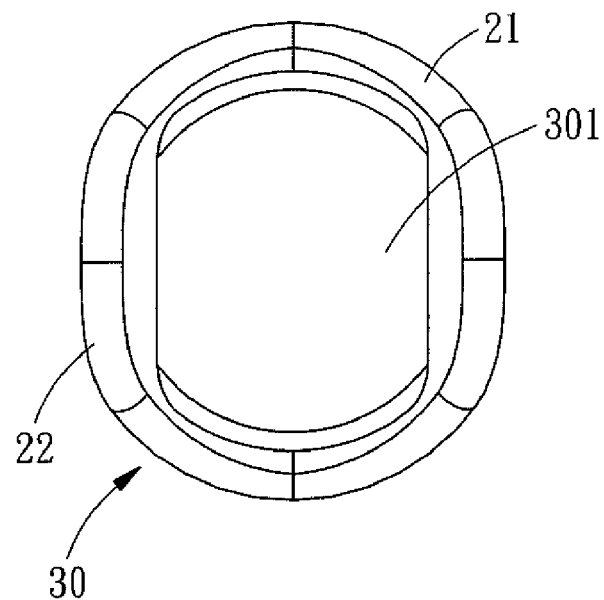
FIG. 9 shows a non-loading surface of the roller retainer in accordance with the present invention.
Figure 10:
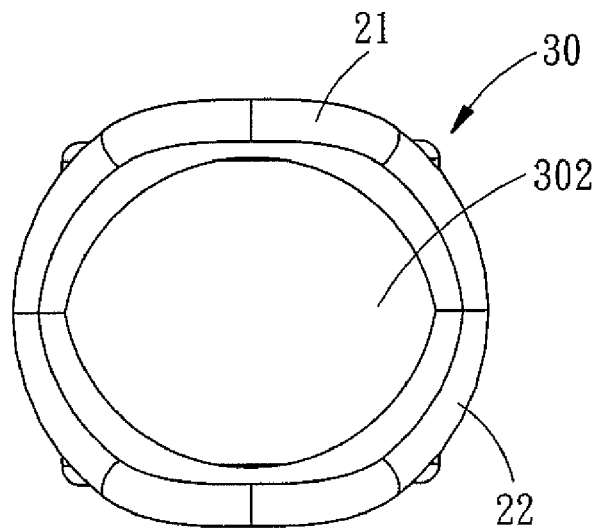
FIG. 10 shows a loading surface of the roller retainer in accordance with the present invention.

It is to be noted that, as shown FIGS. 8-10, the second frame 22 are frame-shaped structures located along the two diagonals of the roller 30, the first guiding frame 21 is located along one diagonal of the roller 30, and the second guiding frame 22 is located along the other diagonal of the roller 30. In such a way, the thickness X, Y at the loading direction of the first guiding frame 21 and the second guiding frame 22 maintain the space between the two non-loading surfaces 301 and the track 33 and to keep the space between each roller 30. Consequently, the non-loading surfaces 301 can be prevented from colliding with the surface of the track 33, so as to avoid the unnecessary collision and attrition.

It is to be noted that, since the first guiding frame 21 and the second guiding frame 22 are located along the two diagonals of the roller 30, the thickness X, Y of the first guiding frame 21 and the second guiding frame 22 need not to be too thick, it is enough to stably position the roller 30. Therefore, the space between each roller 30 caused by the roller retainer 20 will not be excessively large. Consequently, a predetermined number of rollers 30 can be disposed in the track 33 and the load capacity of the product can be kept.

It is important that, the two non-loading surfaces 301 of the present invention are restricted at two directions of the first guiding frame 21 and the second guiding frame 22. Thereby, the roller 30 will still be less likely to incline or fall off even when subjected to a torque force. Hence, the present invention can effectively reduce the noise and improve the operation stability.

To summarize, the roller retainer in accordance with the present invention comprises the first guiding frame and the second guiding frame that are integrally connected with each other in the vertically staggered manner. The first guiding frame and the second guiding frame are located along the two diagonals of roller, and the thickness of the first guiding frame and the second guiding frame are used to maintain the space between the two non-loading surfaces and the track, the roller retainer can further keep the space between each roller. Thereby, the roller retainer in accordance with the present invention can prevent the rollers from contacting each other, the loading surfaces of the roller can still contact the track and the non-loading surfaces of the roller are prevented from colliding with and rubbing against the track, thus reducing the noise and ensuring the moving direction.

While we have shown and described various embodiments in accordance with the present invention, it is clear to those skilled in the art that further embodiments may be made without departing from the scope of the present invention.

What is claimed is:

1. A roller retainer mounted on a roller comprising a first guiding frame and a second guiding frame integrally connected with each other in a vertically staggered manner, wherein:

the first guiding frame is located along a diagonal of the roller, and the first guiding frame utilizes its thickness to maintain a space of non-loading surface of the roller;

the second guiding frame is integrally connected with the first guiding frame in a vertically staggered manner, and the second guiding frame is located along the other diagonal of the roller, the second guiding frame utilizes its thickness to maintain a space of non-loading surface of the roller.

2. The roller retainer as claimed in claim 1, wherein the second guiding frame and the first guiding frame are vertically staggered.

3. The roller retainer as claimed in claim 2, wherein an outer surface of the roller retainer is a circular arc surface.

4. The roller retainer as claimed in claim 1, wherein an outer surface of the roller retainer is a circular arc surface.

5. The roller retainer as claimed in claim 1, wherein the thickness of the first guiding frame and the second guiding frame in the loading direction of the roller is equal.

* * * * *